(12) United States Patent
Lewis

(10) Patent No.: US 6,275,803 B1
(45) Date of Patent: Aug. 14, 2001

(54) UPDATING A LANGUAGE MODEL BASED ON A FUNCTION-WORD TO TOTAL-WORD RATIO

(75) Inventor: James R. Lewis, Delray Beach, FL (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/249,940

(22) Filed: Feb. 12, 1999

(51) Int. Cl.[7] ........................................... G10L 15/18
(52) U.S. Cl. ........................................ 704/257; 704/244
(58) Field of Search ................................. 704/255–257, 704/270, 251, 260, 244, 235

(56) References Cited

U.S. PATENT DOCUMENTS 5,428,707 * 6/1995 Gould et al. .......................... 704/255
5,625,748 * 4/1997 McDonough et al. ................ 704/251
6,009,392 * 12/1999 Kanevsky et al. ................... 704/255

* cited by examiner

Primary Examiner—David D. Knepper
(74) Attorney, Agent, or Firm—Akerman Senterfitt

(57) ABSTRACT

Sample text is evaluated to determine if it is suitable for updating a language file in a computer speech recognition system. The evaluation is performed by retrieving from a memory a sample text file containing text and a function word file containing a list of function words. The sample text file is processed to determine a total number of words it contains and a total number of function words it contains. A ratio is calculated for the total number of function words relative to the total number of words. Based upon the value of the ratio thus calculated a decision can then be made as to whether to update a language model.

11 Claims, 4 Drawing Sheets

UPDATING A LANGUAGE MODEL BASED ON A FUNCTION-WORD TO TOTAL-WORD RATIO

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech recognition computer applications and more specifically to a system for automatically updating the language model which is used by the speech recognition software engine.

2. Description of the Related Art

Speech recognition is the process by which an acoustic signal received by microphone are converted to a set of words by a computer. These recognized words may then be used in a variety of computer software applications for purposes such as document preparation, data entry and command and control. Speech recognition is generally a difficult problem due to the wide variety pronunciations, individual accents and speech characteristics of individual speakers. Consequently, language models are often used to help reduce the search space of possible words and to resolve ambiguities as between similar sounding words. Such language models tend to be statistically based systems and can be provided in a variety of forms. The simplest language model can be specified as a finite state network, where the permissible words following each word are given explicitly. However, more sophisticated language models have also been developed which are specified in terms of a context specified grammar.

Conventional speech recognition systems permit language models to be updated by analyzing samples of existing text. The analysis process in such conventional systems involves a process whereby the speech recognition software compiles statistics relating to the likelihood that a particular word precedes or follows some other word. A bigram model or sometimes a trigram is typically used to represent this data with regards to certain word pairs or even triplets. Such conventional systems generally require that a decision be made by the user as to whether the analyzed sample data should be used to update the language model for a particular user. However, such systems typically do not provide the user with any basis upon which to determine whether a particular sample of existing text is appropriate to be used for the purpose of updating the language model. Thus a user may inadvertently update the language model using a sample of text which is not representative of how a set of words are actually used in ordinary speech. As a result, the language model may be degraded. Accordingly, it would be desirable to provide a method of allowing a speech recognition system to automatically determine whether to update the language model using particular existing text.

BRIEF DESCRIPTION OF THE DRAWINGS

There are presently shown in the drawings embodiments which are presently preferred, it being understood, however, that the invention is not so limited to the precise arrangements and instrumentalities shown, wherein.

DETAILED DESCRIPTION OF THE INVENTION

Figure 1:
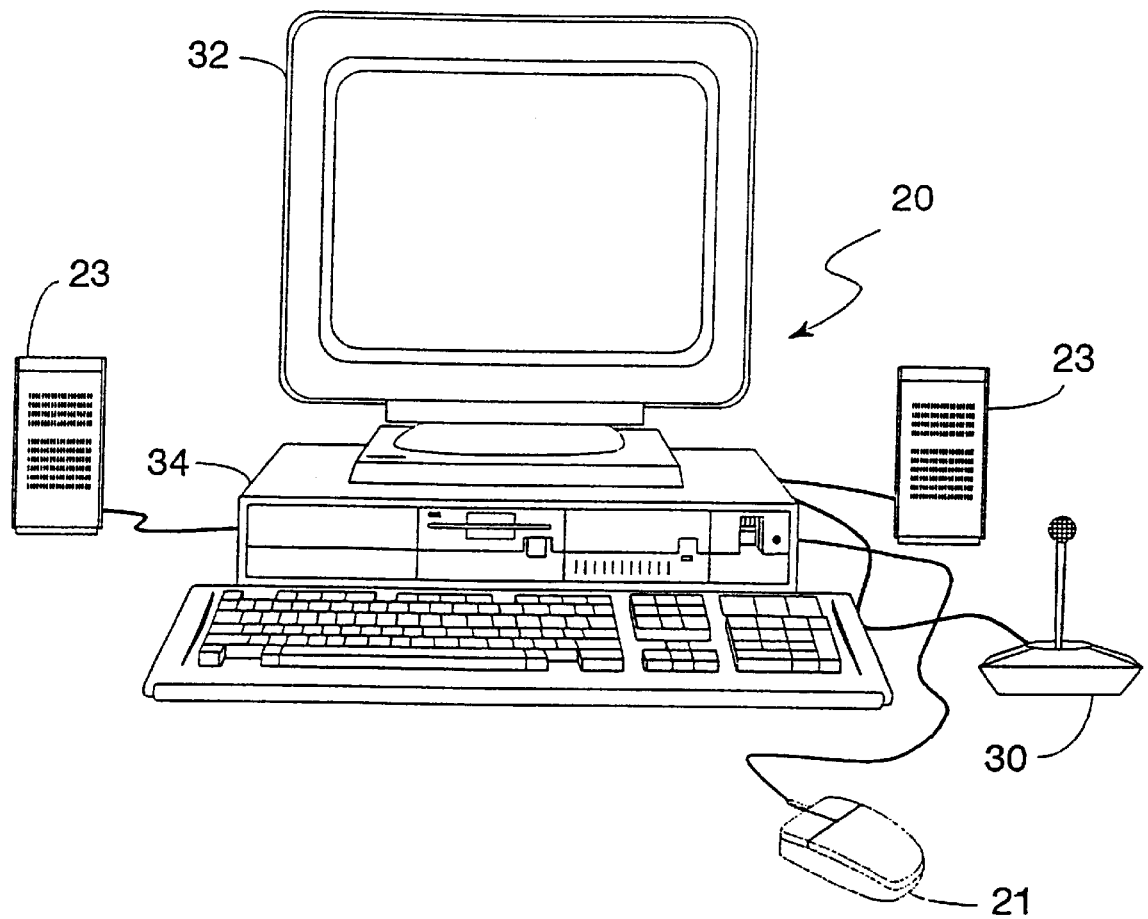
FIG. 1 shows a computer system for speech recognition on which the system of the invention may be used.

FIG. 1 shows a typical computer system 20 for use in conjunction with the present invention. The system is preferably comprised of a computer 34 including a central processing unit (CPU), one or more memory devices and associated circuitry. The system also includes a microphone 30 operatively connected to said computer system through suitable interface circuitry or "sound board" (not shown), and at least one user interface display unit 32 such as a video data terminal (VDT) operatively connected thereto. The CPU can be comprised of any suitable microprocessor or other electronic processing unit, as is well known to those skilled in the art. An example of such a CPU would include the Pentium or Pentium II brand microprocessor available from Intel Corporation or any similar microprocessor. Speakers 23, as well as an interface device, such as mouse 21, may also be provided with the system, but are not necessary for operation of the invention as described herein.

The various hardware requirements for the computer system as described herein can generally be satisfied by any one of many commercially available high speed multimedia personal computers offered by manufacturers such as International Business Machines Corporation (IBM), Compaq, Hewlett Packard, or Apple Computers.

Figure 2:
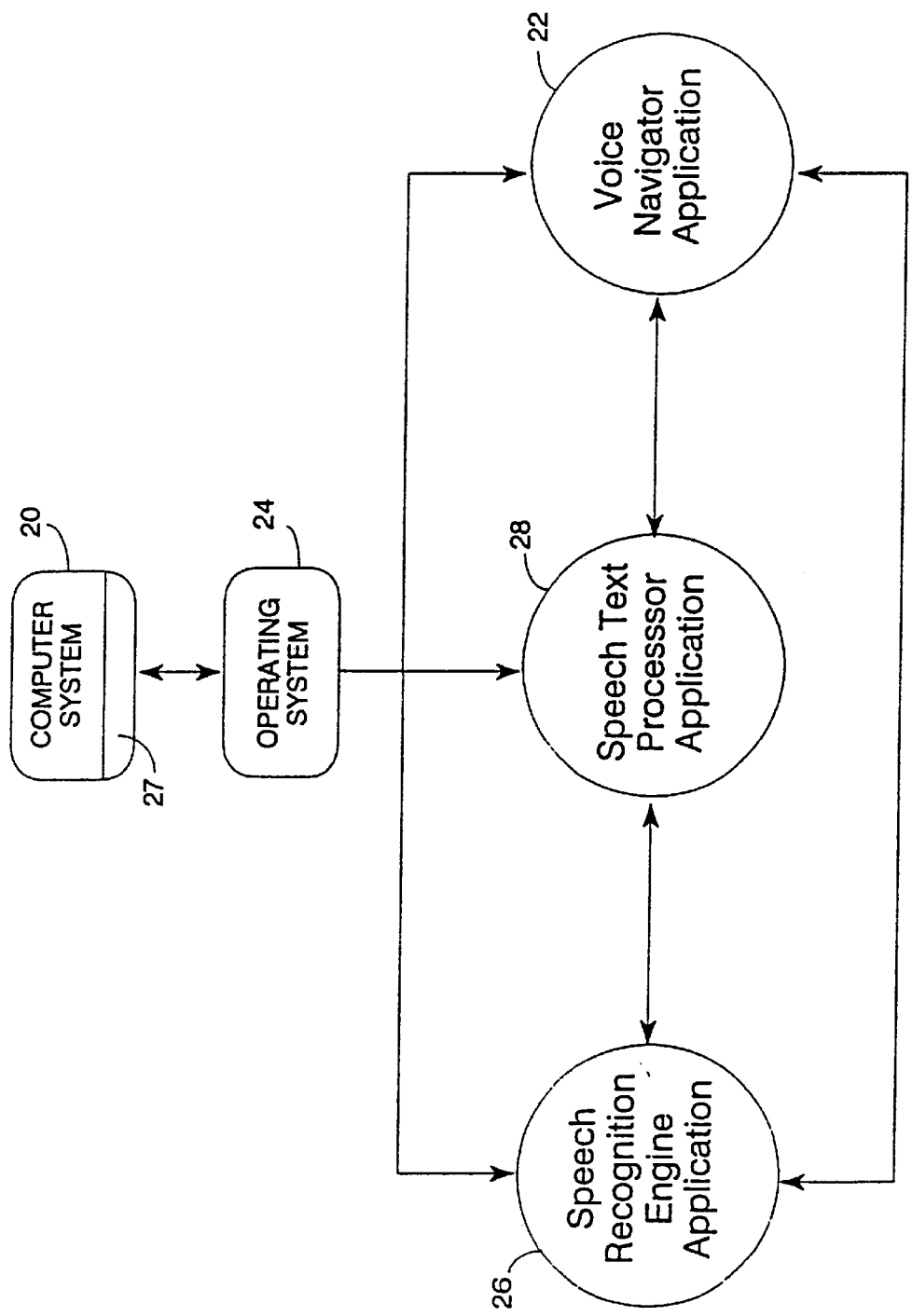
FIG. 2 is a block diagram showing a typical high level architecture for the computer system in FIG. 1.

FIG. 2 illustrates a typical architecture for a speech recognition system in computer 20. As shown in FIG. 2, the system typically includes an operating system 24 and a speech recognition engine application 26. A speech text processor application 28 and a voice navigator application 22 may also be provided. In FIG. 2, the speech recognition engine 26, speech text processor 28 and the voice navigator 22 are shown as separate application programs. It should be noted however that the invention is not limited in this regard, and these various application could, of course be implemented as a single, more complex application program. Also, if no other speech controlled application programs are to be operated in conjunction with the speech text processor application and speech recognition engine, then the system may be modified to operate without the voice navigator application. The voice navigator primarily helps coordinate the operation of the speech recognition engine application.

In a preferred embodiment which shall be discussed herein, operating system 24 is one of the Windows family of operating systems, such as Windows NT, Windows 95 or Windows 98 which are available from Microsoft Corporation of Redmond, Washington. However, the system is not limited in this regard, and the invention may also be used with any other type of computer operating system. The system as disclosed herein can be implemented by a programmer, using commercially available development tools for the operating systems described above. As shown in FIG. 2, computer system 20 includes a computer memory device 27, which is preferably comprised of an electronic random access memory and a bulk data storage medium, such as a magnetic disk drive.

Audio signals representative of sound received in microphone 30 are processed within computer 20 using conventional computer audio circuitry so as to be made available to the operating system 24 in digitized form. The audio signals received by the computer are conventionally provided to the speech recognition engine application 26 via the computer operating system 24 in order to perform speech recognition functions. As in conventional speech recognition systems, the audio signals are processed by the speech recognition engine 26 to identify words spoken by a user into microphone 30.

Figure 3:
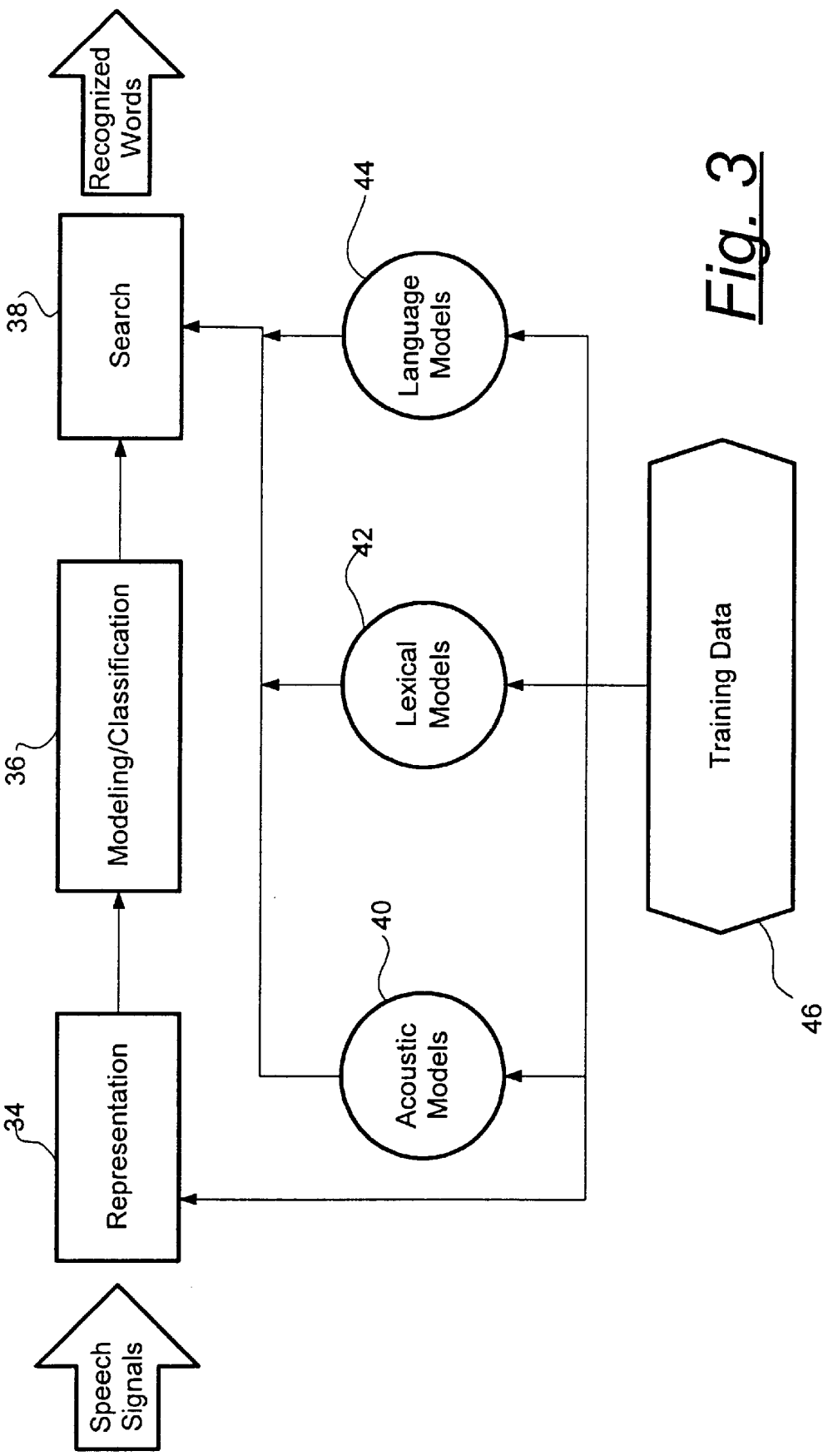
FIG. 3 is a block diagram showing a typical architecture for a speech recognition engine.

FIG. 3 is a block diagram showing typical components which comprise speech recognition application 26. As shown in FIG. 3 the speech recognition engine 26 receives a digitized speech signal from the operating system. The signal is subsequently transformed in representation block 34 into a useful set of data by sampling the signal at some fixed rate, typically every 10–20 msec. The representation block produces a new representation of the audio signal which can then be used in subsequent stages of the voice recognition process to determine the probability that the portion of waveform just analyzed corresponds to a particular phonetic event. This process is intended to emphasize perceptually important speaker independent features of the speech signals received from the operating system. In modeling/classification block 36, algorithms process the speech signals further to adapt speaker-independent acoustic models to those of the current speaker. Finally, in search block 38, search algorithms are used to guide the search engine to the most likely words corresponding to the speech signal. The search process in search block 38 occurs with the help of acoustic models 40, lexical models 42 and language models 44.

Language models 44 are used to help restrict the number of possible words corresponding to a speech signal when a word is used together with other words in a sequence. The language model may be specified very simply as a finite state network, where the permissible words following each word are explicitly listed, or may be implemented in a more sophisticated manner making use of context sensitive grammar. In any case, it is often desirable to update the content of the language model with information concerning speech patterns likely to be encountered in the case of a specific user. However, only certain kinds of text are most suitable for updating the language model. For example, texts which are primarily lists containing disjointed words and phrases are not generally suitable for this purpose.

Figure 4:
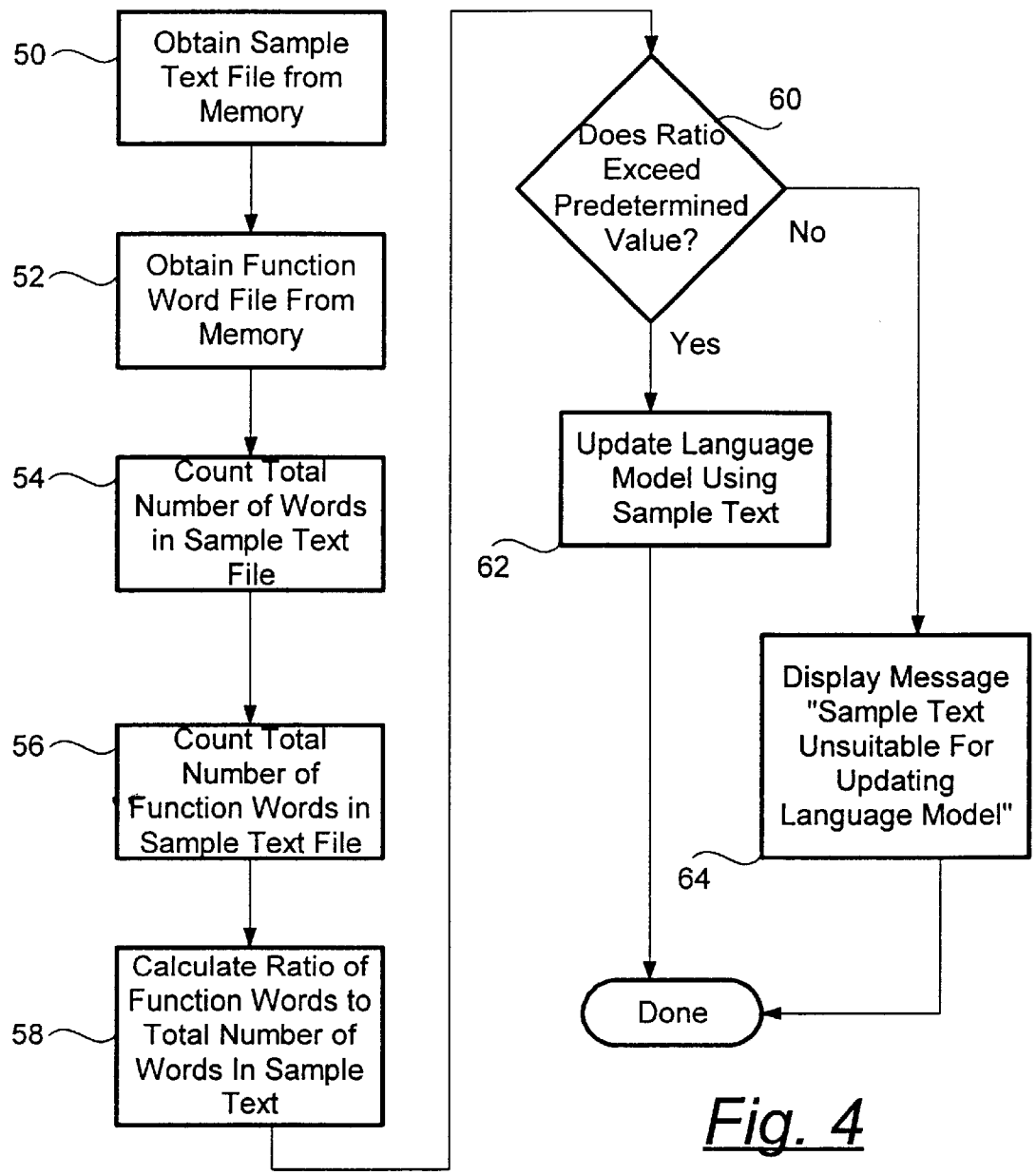
FIG. 4 is flow chart illustrating a process for automatically analyzing a sample text document and determining whether to update the language model for a speech recognition system.

FIG. 4 is a flow chart illustrating how a speech recognition system may automatically determine whether a particular language model should be updated after analyzing a particular sample text. In step 50, the speech recognition engine application 26 obtains from memory a sample text file designated by the user for the purpose of updating the language model. As will be appreciated by those skilled in the art, the sample text file may be in any standard format for text which is capable of being recognized and understood by a computer. For example, the sample text may be in the form of a word processing application file recognizable by well known word processing applications such as those offered under the trade names Microsoft Word® or WordPerfect®.

In step 52, the speech recognition engine application 26 retrieves from memory a Function Word file. The Function Word file contains a list of function words. Function words are those which typically occur only in grammatical expressions. These includes words such as prepositions, quantifiers, determiners, pronouns, and so on. Examples of function words include those such as: "and", "or", "in", "of", "the" and "a". Function words are to be distinguished from content words. Content words are those which appear both in grammatical expressions and non-grammatical expressions (such as class notes or newspaper headlines). Examples of these content words include nouns, verbs, adverbs and adjectives. In a language, there are many thousands of content words, but only a fixed and fairly small number of function words. The category of words described herein as function words is well know to those skilled in the language fields. See for example the discussion in the text "An Introduction to Language" by Fromkin, V., & Rodman R., Fort Worth, Texas: Harcourt, Brace, Jovanovich, p. 39 (1993).

In step 54, the speech recognition application 26 counts the total number of words in the sample text file. In step 56, the speech recognition application counts the total number of function words in the sample text file. Once these two values have been obtained, a function word ratio is calculated in step 58. The function word ratio is defined as the ratio of the number of function words to the total number of words in the sampled text. This information is then evaluated in step 60.

Normal text which is most suitable for updating the language model will have a function word ratio of approximately 0.5. Thus, in step 60 the function word ratio is compared to a pre-determined minimum value to determine if the text should be used to update the language model. According to a preferred embodiment, the pre-determined minimum value should be in the range of approximately 0.6 to 0.3. A minimum value greater than 0.6 will potentially exclude sample text which is suitable for updating a language model. A predetermined minimum value which is less than about 0.3 will tend to result in unsuitable sample text potentially being used to update the language model.

In FIG. 4, the function word ratio is compared to the predetermined minimum value in step 60. If the function word ratio exceed the minimum value, then the application 26 proceeds to update the language model using the sample text in step 62. Alternatively, if the function word ratio does not exceed the predetermined minimum value, then a message is preferably displayed in step 64 to inform the user that the sample text is unsuitable to be used for updating the language model.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. In a computer system for speech recognition, a method for evaluating sample text comprising the steps of:
    retrieving from a memory a sample text file containing text;
    retrieving from said memory a function word file containing a list of function words;
    processing said sample text file to determine a total number of words and a total number of function words contained therein;
    calculating a ratio of said total number of function words to said total number of words; and
    updating a language model.

2. The method according to claim 1 further comprising the step of comparing said ratio to a predetermined value.

3. The method according to claim 2 further comprising the step of updating said language model only if said ratio exceeds said predetermined value.

4. The method according to claim 2 further comprising the step of informing a computer system user that the sample text is unsuitable for updating a language model if said ratio does not exceed said predetermined value.

5. The method according to claim 2 wherein said predetermined value is between 0.3 and 0.6.

6. A system for automatically evaluating a sample text to determine if it is suitable for updating a language model in a computer speech recognition system comprising:

means for retrieving from a computer memory a sample text file containing text;

a function word file containing a list of function words;

processing means for analyzing said sample text file to determine a total number of words and a total number of function words contained therein;

calculating means for calculating a ratio of said total number of function words to said total number of words; and updating means for updating a language model responsive to said calculating means.

7. The system according to claim 6 further comprising means for comparing said ratio to a predetermined value.

8. The system according to claim 7 wherein said updating means updates said language model when said ratio exceeds said predetermined value.

9. The system according to claim 7 wherein said updating means informs a computer system user that the sample text is unsuitable for updating a language model when said ratio does not exceed said predetermined value.

10. The system according to claim 7 wherein said predetermined value is between 0.3 and 0.6.

11. A machine readable storage, having stored thereon a computer program having a plurality of code sections executable by a machine for causing the machine to perform the steps of:

retrieving from a memory a sample text file containing text;

retrieving from said memory a function word file containing a list of function words;

processing said sample text file to determine a total number of words and a total number of function words contained therein;

calculating a ratio of said total number of function words to said total number of words; and updating a language model.

* * * * *